United States Patent [19]

Courbot

[11] Patent Number: 4,588,052
[45] Date of Patent: May 13, 1986

[54] DRUM BRAKE

[75] Inventor: Pierre Courbot, Villiers le Bel, France

[73] Assignee: Societe Anonyme D.B.A., Paris, France

[21] Appl. No.: 664,085

[22] Filed: Oct. 23, 1984

Related U.S. Application Data

[63] Continuation of Ser. No. 392,821, Jun. 28, 1982, abandoned.

[30] Foreign Application Priority Data

Jul. 10, 1981 [FR] France .............................. 81 13592

[51] Int. Cl.$^4$ .............................................. F16D 65/40
[52] U.S. Cl. .......................... 188/79.5 P; 188/196 BA; 192/111 A
[58] Field of Search ............... 188/196 BA, 79.5 P, 188/79.5 GT; 192/111 A

[56] References Cited

U.S. PATENT DOCUMENTS

| | | | |
|---|---|---|---|
| 2,998,104 | 8/1961 | McClure et al. | 188/196 BA |
| 3,356,193 | 12/1967 | Stowers | 188/196 BA |
| 3,618,715 | 11/1971 | Bostwick | 188/196 BA X |
| 4,196,795 | 4/1980 | Izumi | 188/79.5 P |
| 4,243,125 | 1/1981 | Spaargaren et al. | 188/79.5 P |

FOREIGN PATENT DOCUMENTS

| | | | |
|---|---|---|---|
| 2457415 | 12/1980 | France . | |
| 411567 | 6/1934 | United Kingdom | 188/196 BA |
| 1507550 | 4/1978 | United Kingdom . | |

Primary Examiner—George E. A. Halvosa
Attorney, Agent, or Firm—Larry J. Palguta; Ken C. Decker

[57] ABSTRACT

The drum brake comprise two shoes (12, 14) equipped with friction elements (24, 26) capable of being urged into frictional engagement by an applying mechanism (28) arranged between two first ends (30, 32) of the shoes (12, 14), a fixed anchor block (34) disposed between the other two ends (36, 38) of the shoes, a spacer (44) mounted near the applying mechanism (28) and bearing at each end on one of said shoes, the spacer (44) including a device which lengthens automatically as a function of wear of the friction elements and constituted by a screw-nut system (58, 60) controlled by a pawl (76) mounted on an articulated arm (62) acting on a ratchet wheel (58). The deflectin of arm (62) and pawl (76) is an amplitude which increases as the distance between the drum and shoes increases, with the articulated arm (62) including an auxiliary portion (78) also acting on the ratchet wheel (58) when deflection of the articulated arm (62) reaches a predetermined displacement, whereby there is an increase in the rate at which the shoes are brought nearer to the drum.

3 Claims, 4 Drawing Figures

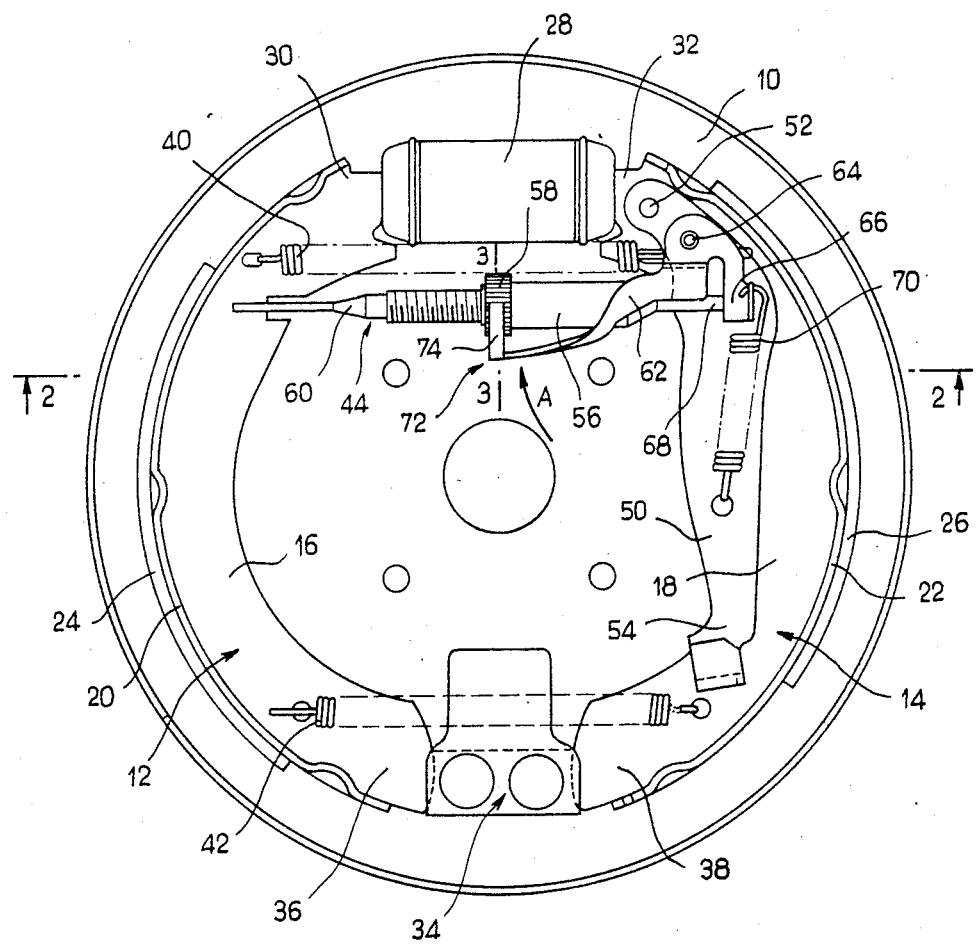
FIG_1

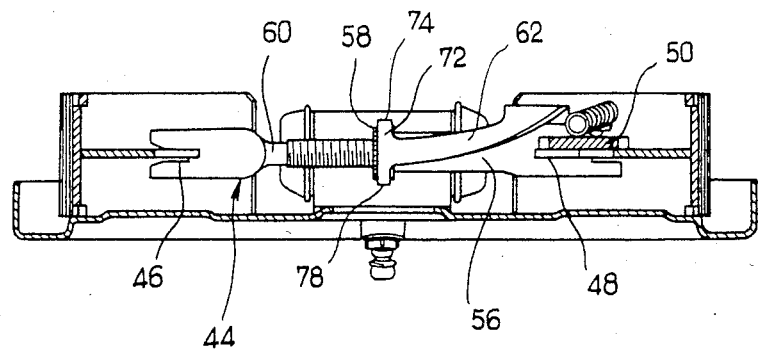
FIG_2
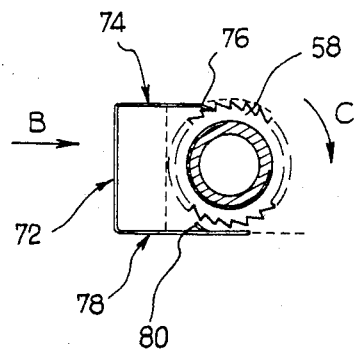
FIG_3
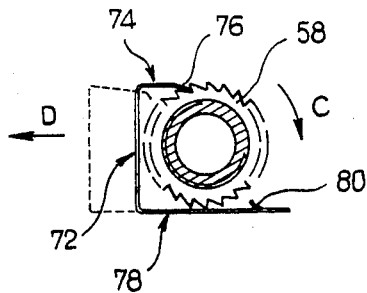
FIG_4

DRUM BRAKE

This is a continuation of application Ser. No. 392,821 filed June 28, 1982, now abandoned.

The invention relates to a drum brake especially suitable for equipping a motor vehicle.

The invention particularly concerns a drum brake equipped with an automatic adjustment device intended to compensate automatically for wear on the friction linings associated with the brake shoes in order to keep the travel at the brake pedal necessary for operating the latter substantially constant and small.

There are many known drum brakes equipped with automatic adjustment devices, but most of these devices have some disadvantages. In particular, these devices usually ensure adjustment without distinguishing between the increase in the spacing of the shoes due to wear on the linings and that due to expansion of the drum resulting from the brake overheating. To avoid the risk of overadjustment which results from this, significant working clearance generally has to be provided, with a corresponding large dead travel at the brake control pedal. Among known drum brakes, there is, however, a brake which allows this disadvantage to be almost entirely eliminated. This brake is described in U.S. Pat. No. 2,570,398, in which the automatic adjustment device is constituted by a ratchet system acting on a screw-nut system so as to lengthen a spacer progressively with wear on the friction elements. The reduction obtained with this device allows adjustment by successive advances and therefore avoids overadjustment due to temporary overheating.

In a brake of this type, operation of the wheel cylinder has the double effect of applying the friction linings associated with the shoes against the brake drum and making the adjustment pawl pivot by an amount corresponding to the clearance existing between the shoes and the drum. If the clearance is sufficient to justify adjustment, the pawl engages the following tooth of the ratchet wheel and on return, on release of the brake, the pawl turns the nut of the screw-nut system by the amount corresponding to the overtaken tooth. This device allows limited adjustment to be obtained in small amounts as a result of the reduction obtained by the screw-nut system so that it avoids the overadjustment inherent in the majority of other known adjustment devices. The brake just described can in practice only follow the very slow phenomena associated with wear.

This device, however, has the disadvantage of requiring that the brakes be applied a great number of times in order to draw the shoes closer to the drum when the brake is new; in practice, to be able to mount the drum, it is necessary for significant clearance to exist between the shoes and the drum when the latter is fitted. As a result, after action on the drum, the travel of the brake control pedal will be significant throughout a large number of applications of the brake until the device for automatically taking up wear brings the shoes sufficiently close to the drum for there to be normal clearance between the shoes and the drum.

The invention proposes a drum brake with the advantages of the brake just described, especially as concerns elimination of the risk of overadjutment of the brake, and which allows accelerated adjustment to be obtained when the shoes are at a large distance from the brake drum.

To this end, the invention proposes a drum brake with automatic adjustment comprising two shoes equipped with friction elements capable of being urged into frictional engagement against a rotating drum by applying means arranged between two first ends of the shoes, a fixed anchor block disposed between the two other ends of the shoes, a spacer mounted near the applying means and bearing with each of its ends on each of said two shoes, said spacer comprising a device which lengthens automatically as a function of the wear on the friction elements and is formed by a screw-nut system controlled by a pawl mounted on an articulated arm acting on a ratchet wheel, the deflection of said arm and hence of said pawl being of an amplitude which increases as the distance between the drum and said shoes increases, characterized in that said articulated arm includes an auxiliary portion also acting on the ratchet wheel when the deflection of the articulated arm reaches a predetermined value so as to increase the rate of which the shoes are brought nearer the drum.

It is clear that, by means of these characteristics, the automatic take up device allows very reduced adjustment when there is normal clearance between the shoes and the drum, on the one hand, and accelerated adjustment when the clearance between the shoe and the drum is large, on the other.

Two embodiments of the invention will now be described, by way of non-limiting example, with reference to the attached drawings in which:

FIG. 1 is a plan view of a drum brake made according to the teaching of the present invention;

FIG. 2 is a sectional view at the line 2—2 of FIG. 1;

FIG. 3 is an enlarged partial section at the line 3—of FIG. 1;

FIG. 4 is an enlarged partial sectional view at the line 3—3 of FIG. 1 of a second embodiment of the invention.

The drum brake represented in FIG. 1 comprises a support plate 10 designed to be associated with a fixed part of the vehicle (not represented) and on which two brake shoes 12 and 14 are received slidingly. Each of the shoes 12 and 14 includes a substantially flat web 16, 18 and an arcuate rim 20, 22 on which a friction lining 24, 26 is mounted respectively by means of rivets or the like. Applying means, constituted in the embodiment represented by a wheel cylinder 28, is arranged between the two first adjacent ends 30 and 32 of the shoes 12 and 14 respectively, and an anchor block 34, associated with the support plate 10, is disposed between the other two ends 36 and 38 of the shoes 12 and 14. In addition, return springs 40 and 42 are arranged respectively near the wheel cylinder 28 and the anchor block 34 to urge the ends 30 and 32 of the shoes against the wheel cylinder 28 and the ends 36 and 38 of the shoes against the anchor block 34 respectively.

As FIG. 2 shows in more detail, a spacer 44 is disposed between the shoes 12 and 14 near the wheel cylinder 28 to define the distance separating the ends 30 and 32 of the shoes at rest. Each of the ends of the spacer 44 includes a U-shaped notch 46, 48 in which the webs 16 and 18 of the shoes 12 and 14 are respectively received. In the embodiment represented, the notch 48 also receives a hand brake lever 50 mounted to pivot on the end 32 of the shoe 14 by means of a rivet 52 forming a pivot and whose free end 54 is bent back to receive one end of a hand brake control cable (not represented) whose other end is designed to be connected to a control lever disposed in the driver compartment of the vehicle. The spacer 44 is formed by a first element 56 of tubular form bearing on a ratchet wheel 58 screw-threadedly mounted on a second element 60 of the spacer 44; this element 60 is slidingly mounted in the bore of the tubular part of the first element 56. The ratchet wheel 58 and the second element 60 form a screw-nut system lengthening device. An arm 62 is mounted articulated on the hand brake lever 50 by means of a shaft 64 forming a pivot. The arm 62 includes a projection 66 kept bearing on the end 68 of the first element 56 by means of a spring 70, one end of which bears on the projection 66 and the other end of which is hooked onto the hand brake lever 50. The arm 62 bears a U-shaped portion 72 which, as a fork, engages the ratchet wheel 58. A first limb 74 of the U-shaped portion forms a pawl 76 which cooperates with the toothing of the ratchet wheel 58 as FIG. 3 shows in detail. The other limb 78 of the U-shaped portion 72 bears a projection 80 which is disengaged from the ratchet wheel 58 when the arm 62 is in the rest position as represented in FIG. 3.

The drum brake just described with reference to FIGS. 1 to 3 works in the following way:

At rest, and when the friction linings 24 and 26 are new, the various elements constituting the brake are in the positions represented in FIGS. 1, 2 and 3. When the wheel cylinder 28 is operated, the ends 30 and 32 of the shoes 12 and 14 are urged apart from each other so that the friction linings 24 and 26 are brought into engagement with the brake drum (not represented) so as to create a braking torque. Simultaneously, the spacer 44 moves left, with reference to FIG. 1, with the end 30 of the shoe 12 under the action of the spring 70 which pushes back the end 68 of the first element 56 by means of the projection 66 of the arm 62 articulated on the pivot 64. When the arm 62 pivots in accordance with the arrow A, the U-shaped portion 72 moves in accordance with the arrow B of FIG. 3 which causes rotation of the ratchet wheel in the direction of the arrow C by means of the pawl 76 cooperating with the toothing of the ratchet wheel 58. On release of the brake the portion 72 moves in the opposite direction to the arrow B and if there has been sufficient amplitude of the movement jumps a tooth so as to be able to ensure adjustment at the time of the next application.

When the distance between the brake shoes and the drum is large, the amplitude of the deflection of the arm 62 with respect to the ratchet wheel is large. The U-shaped portion 72 then moves to the position represented in dotted lines in FIG. 3, the pawl 76 after having turned the ratchet wheel 58 becomes inoperative, while the projection 80 engages in the toothing of the ratchet wheel and turns the wheel 58 in the direction of arrow C when the brake is released, under the action of the return spring 40 which pushes back the spacer 44, or, more precisely, when the return spring 40 pushes back the projection 66 of the arm 62 across the end 68 of said spacer 44.

When the clearance between shoes and drum becomes normal, the amplitude of deflection of the arm 62 becomes smaller, and the projection 80 is no longer able to cooperate with the toothing of the ratchet wheel 58 (only the pawl 76 operates); the rate at which the spacer 44 is lengthened therefore becomes slower and corresponds to normal take up of wear on the friction elements.

FIG. 4 shows a second embodiment in which the members with the same function bear the same references. In this embodiment represented in its rest position, the pawl 76 rotates the ratchet wheel 58 when the brake is released. In practice, on application of the brake, the arm 62 and the U-shaped portion 72 move the direction of the arrow D, the pawl 76, when there is sufficient amplitude, jumps a tooth, and on release of braking pressure the pawl 76 turns the ratchet wheel in the direction of the arrow C. When the amplitude of the movement of the arm 62 reaches a predetermined value as represented in dotted lines in FIG. 4, the projection 80 then turns the ratchet wheel 58 in the direction of the arrow C on application of the brake, and on return the pawl 76 also turns the same ratchet wheel 58 in the direction of the arrow C. To implement this second embodiment, it is clear that the arm 62 must be modified so that the U-shaped portion is located between the spacer 44 and the wheel cylinder 28, or, if the position of the arm as represented in FIG. 3 is kept, the pivot 64 must be located below the point of contact between the shoe 14 and the spacer 44 so as to invert the movements of the arm 62.

In the light of the preceding description, it is evident that the invention allows two rates of lengthening of the spacer to be obtained, a slow speed in which only the pawl 76 works, and a rapid speed in which the projection 80 and the pawl 76 work alternately. The invention therefore allows a rapid rate of approach for the shoes and then a slow adjustment to compensate solely for the wear on the friction elements.

The drum brake just described by way of example clearly does not limit the scope of the invention which can be applied to different variants involving both the nature of the brake control means and the possible omission of the hand brake lever. Modifications can also be envisaged in the adjustment device itself, especially as regards the structure and shape of the various elements which constitute it.

In particular, the articulation of the arm 62 as well as its shape can be modified without exceeding the scope of the present invention.

I claim:

1. A drum brake with automatic adjustment of the friction elements, comprising two brake shoes equipped with friction elements capable of being urged into frictional engagement with a rotating drum, applying means for urging said friction elements into engagement with the drum and arranged between two first ends of the brake shoes, a fixed anchor block disposed between two other ends of the brake shoes, spacer means for adjustably positioning said shoes and mounted near the applying means with ends of the spacer means bearing on said shoes, said spacer means comprising a device which lengthens automatically as a function of the wear of the friction elements and including a screw-nut system controlled by a pawl of an articulated arm in position for actuating a ratchet wheel, deflection movement of said arm and pawl increasing as the distance between the drum and brake shoes increases, characterized in that said spacer means has a variable rate of operation wherein the articulated arm includes an auxiliary portion positioned for actuating the ratchet wheel when the increased deflection movement of the articulated arm reaches a predetermined displacement, the pawl and auxiliary portion being in position so that the ratchet wheel is actuated during both deflection and return movements of the articulated arm when said predetermined displacement occurs, the rate at which the friction elements are brought nearer to the drum being increased in response to the occurence of said predetermined displacement and without an increase in the number of deflection movements, the articulated arm comprising a U-shaped portion with two limbs and a connecting member therebetween, the pawl formed on one limb and the auxiliary portion forming the other limb, the auxiliary portion including a projection extending from said auxiliary portion and for actuating said ratchet wheel, the pawl and projection each having an end for engaging the ratchet wheel and the ends being positioned asymmetrically on the limbs of the articulated arm, the asymmetrically positioning comprising the respective ends being positioned at different longitudinal distances from the connecting member of the articulated arm, and the variable rate of operation comprising two different speeds of moving the friction elements nearer to the drum as a function of the distance of the friction elements from said drum.

2. The drum brake according to claim 1, characterized in that said pawl actuates said ratchet wheel in a direction of rotation during application of the applying means, and the projection actuates said ratchet wheel in said direction of rotation during release of the applying means when said predetermined displacement was reached during application of the applying means.

3. The drum brake according to claim 1, characterized in that said projection actuates said ratchet wheel in a direction of rotation during application of the applying means and when said predetermined displacement occurs, said pawl actuating said ratchet wheel in said direction of rotation during release of the applying means.

* * * * *